(12) United States Patent
Cloutier et al.

(10) Patent No.: US 6,436,327 B1
(45) Date of Patent: Aug. 20, 2002

(54) MINI-BALL INSERTION MECHANISM FOR FORMING GOLF BALL CORES

(75) Inventors: Mark Cloutier, Wilbraham; Jon Wigby, Westfield; Vincent J. Simonds, Brimfield, all of MA (US)

(73) Assignee: Spalding Sports Worldwide, Inc., Chicopee, MA (US)

( * ) Notice: Subject to any disclaimer, the term of this patent is extended or adjusted under 35 U.S.C. 154(b) by 47 days.

(21) Appl. No.: 09/730,866

(22) Filed: Dec. 6, 2000

(51) Int. Cl.[7] .......................... B29C 70/70; B29C 43/18
(52) U.S. Cl. .................. 264/248; 264/250; 264/275; 264/278; 264/279.1; 425/116; 425/126.1; 425/3; 425/515; 425/DIG. 33
(58) Field of Search ................................ 264/248, 250, 264/255, 275, 278, 279.1; 425/116, 126.1, 3, DIG. 33, 501, 502, 504, 515, 517; 473/370, 373, 374

(56) References Cited

U.S. PATENT DOCUMENTS

| | | | | |
|---|---|---|---|---|
| 1,481,866 A | * | 1/1924 | Heist ........................... | 264/248 |
| 1,939,894 A | * | 1/1933 | Goodwin ..................... | 425/116 |
| 2,354,017 A | * | 7/1944 | Hazell ......................... | 473/354 |
| 2,363,059 A | * | 11/1944 | Greene et al. ............... | 473/354 |
| 2,363,086 A | * | 11/1944 | Ryan ........................... | 156/146 |
| 2,376,084 A | * | 5/1945 | Radford ....................... | 473/373 |
| 2,998,977 A | * | 9/1961 | Molitor ........................ | 473/354 |
| 3,147,324 A | * | 9/1964 | Ward ........................... | 264/275 |
| 4,501,715 A | | 2/1985 | Barfield et al. | |
| 4,508,309 A | | 4/1985 | Brown | |
| 5,849,237 A | | 12/1998 | Inoue | |
| 5,961,401 A | * | 10/1999 | Masutani et al. ........... | 473/374 |
| 6,036,907 A | * | 3/2000 | Tanaka et al. ............... | 264/248 |
| 6,093,357 A | * | 7/2000 | Bissonette et al. .......... | 264/248 |
| 6,096,255 A | | 8/2000 | Brown et al. | |
| 6,290,797 B1 | * | 9/2001 | Gosetti et al. ............... | 156/228 |
| 6,315,682 B1 | * | 11/2001 | Iwami et al. ................ | 473/370 |

FOREIGN PATENT DOCUMENTS

WO    WO 00/13874    3/2000

* cited by examiner

*Primary Examiner*—Robert Davis

(57) ABSTRACT

A method and apparatus for forming golf ball cores with a generally spherical nucleus at its center is characterized by the use of a transfer plate which insures that the nucleus is centered within the core. The core is formed in upper and lower mold plates which contain upper and lower hemispherical cavities, respectively, which are adapted to mate to define a spherical cavity for the core. The transfer plate is arranged between the mold plates and includes a support for the nucleus to position the nucleus in the center of a pair of upper and lower slugs of core material which are molded in the upper and lower hemispherical cavities. When the mold plates are initially brought together with the transfer plate arranged therebetween and with the slugs arranged on opposite sides of the transfer plate, the slugs are partially molded in the hemispherical cavities with the nucleus being pressed into one of the slugs. The mold plates are then separated and the transfer plate is removed with the nucleus being retained in one of the slugs. Finally, the mold plates are brought together in mating fashion to form the core with the nucleus centrally arranged therein.

12 Claims, 4 Drawing Sheets

MINI-BALL INSERTION MECHANISM FOR FORMING GOLF BALL CORES

BACKGROUND OF THE INVENTION

Desirable features of golf balls include the spin rate and "feel" of the ball when struck. A golf ball with the capacity to obtain a high rate of spin allows a skilled golfer the opportunity to maximize control over the ball which is particularly beneficial when hitting a shot on an approach to the green. A softer feel to the ball is also desirable to the skilled golfer.

Balata covered golf balls are known for their soft feel and high spin rate, but suffer from low durability. Accordingly, another way to soften the feel of the ball is to modify its core material. By concentrating the weight of the golf ball in its center or nucleus, a lighter, more resilient material may be used for the remainder of the core.

Most golf balls currently in use have one of three types of cores: solid, wound, or liquid. Solid cores are formed of various materials, including polybutadiene, natural rubber, metallocene catalyzed polyolefin, polyurethane, other thermoplastic or thermoset elastomers, and mixtures of one or more of the above materials. The core material is generally in the form of a slug which is compression molded to form a spherical core. The core may be formed from a uniform composition or may have two or more layers.

Some solid core golf balls also include a small generally spherical nucleus such as a ball bearing or BB formed of metal or a composite material of metal, plastic, and rubber arranged in the center. The present invention relates to a method and apparatus for accurately positioning the nucleus in the center of a compression molded golf ball core.

BRIEF DESCRIPTION OF THE PRIOR ART

According to current techniques for forming golf ball cores with a weighted nucleus, half slugs of core material are manually placed in upper and lower cavities contained in upper and lower plates of a mold press, and then depressions are formed in the opposing surfaces of the half-slugs by a transfer plate. After removal of the transfer plate, a small nucleus is placed in the depression in the lower half-slug. The press is then closed to mold the core with the nucleus therein.

An example of the current core molding technique is shown in the Brown patent No. 6,096,255. After the half slugs of core material are arranged in concave mold parts, a protrusive mold part is arranged between the slugs and the mold plates are pressed against the protrusive mold part to form cups of core material by compression molding. The center, which may include a liquid component or may be solid, is then placed in the lower cup and the cups are molded together to form the core of a golf ball.

A major drawback of the prior techniques is that the manual placement of the center in the cup formed by the half-slug does not always result in the center being concentrically arranged within the core. Accordingly, there are a high number or defective cores or rejects. In addition, the manual placement of the centers in the cups is time-consuming.

The present invention was developed in order to overcome these and other drawbacks of the prior golf ball core forming devices and techniques by providing an improved core transfer or loading plate which insures that the small nuclei which are arranged within the cores are accurately centered therein while minimizing the time of the core forming process.

SUMMARY OF THE INVENTION

Accordingly, it is a primary object of the present invention to provide a method and apparatus for forming golf ball cores having a centered nucleus of metal or metal composite material including upper and lower mold plates each containing at least one hemispherical cavity which are adapted to mate to define a spherical cavity when the plates are brought together. A transfer plate is arranged between the mold plates. The transfer plate is operable to support a nucleus for each spherical cavity and to position the nucleus in the center of a pair of upper and lower slugs of core material which are molded within the upper and lower hemispherical cavities. The transfer plate also includes a projection on one surface opposite the supported nucleus. When the mold plates are initially brought together with the transfer plate arranged between the mold plates and with the upper and lower slugs of core material arranged on opposite sides of the transfer plate relative to the nucleus, the slugs are pre-formed or initially molded in the hemispherical cavities with the nucleus being pressed within one of the slugs and a cavity being formed in the other slug by the projection on the transfer plate. The mold plates are then separated and the transfer plate is removed. When the mold plates are subsequently brought together in mating fashion, the nucleus enters the cavity in the other slug and a golf ball core is formed from the slugs with the nucleus centrally arranged therein.

According to a first embodiment, the transfer plate includes a plurality of recesses in the upper surface thereof above each of the projections for receiving the nuclei. Each of the nuclei extends above the upper surface of the transfer plate and is pressed into the lower surface of the upper slug when the mold plates are initially brought together. The mold plates are then separated and the transfer plate removed, with the nuclei being retained in the upper slugs.

According to another embodiment, the transfer plate includes a slide plate containing magnets which suspend a nucleus beneath each of the projections in the transfer plate. The nuclei extend below a bottom surface of the transfer plate and are pressed into the upper surfaces of the lower slugs when the mold plates are initially brought together. The slide plate is then shifted to displace the magnets and release the nuclei. The mold plates are then separated and the transfer plate removed, with the nuclei being retained in the lower slugs.

BRIEF DESCRIPTION OF THE FIGURES

Other objects and advantages of the invention will become apparent from a study of the following specification when viewed in the light of the accompanying drawings, in which.

DETAILED DESCRIPTION

Figure 1:
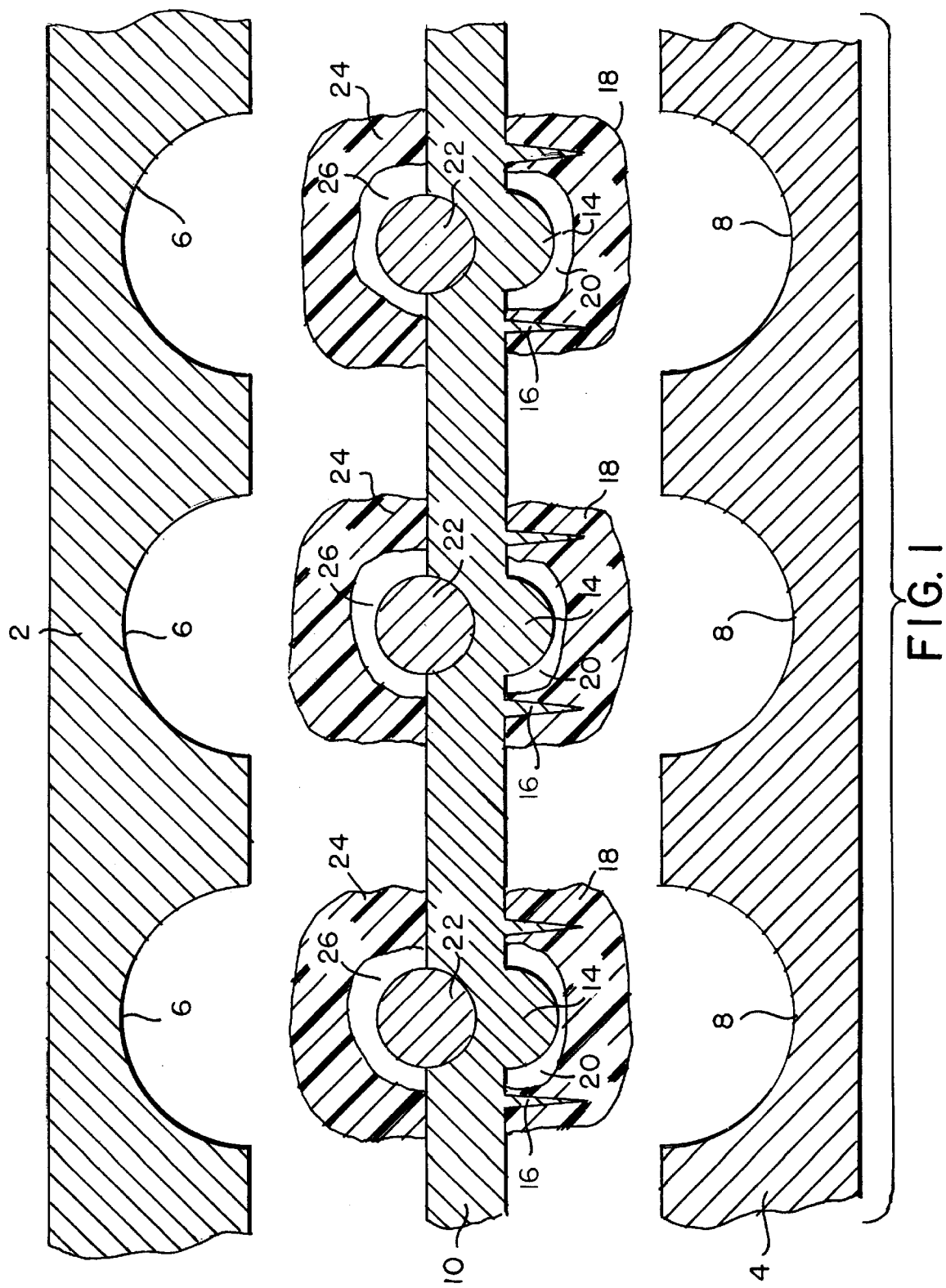
FIG. 1 is a front sectional view of the golf ball core compression mold according to the invention.

Referring first to FIG. 1, the golf ball core forming apparatus according to a first embodiment of the invention will be described. The apparatus includes upper 2 and lower 4 mold plates containing upper 6 and lower 8 hemispherical cavities which define a plurality of spherical cavities when the mold plates are brought together. In FIG. 1, three hemispherical cavities are shown in each mold plate, but it will be appreciated by those skilled in the art that any number of cavities may be provided. Preferably, an array of cavities is provided in each mold plate so that a plurality of golf ball cores can be compression molded simultaneously by the mold plates. For forming conventional soft golf ball cores, slugs of core material are compression molded within the spherical cavities. The slugs are formed of a conventional soft core material such as polybutadiene, natural rubber, metallocene catalyzed polyolefin, polyurethane, other thermoplastic or thermoset elastomers, or mixtures of one or more of the above materials. The present invention uses half-slugs of the same material, with each half slug containing a recess as will be developed in greater detail below.

Figure 2:
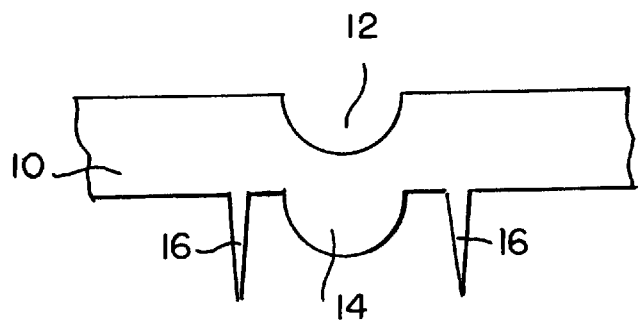
FIGS. 2, 3, and 4 are front, top, and bottom views, respectively, of a transfer plate according to a first embodiment of the invention.
Figure 3:
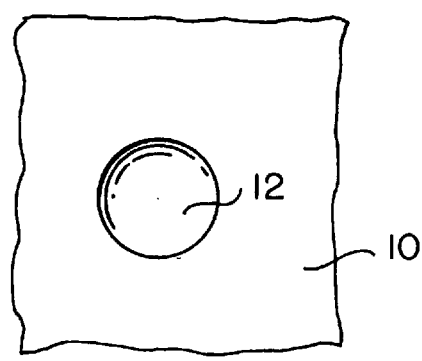
Figure 4:
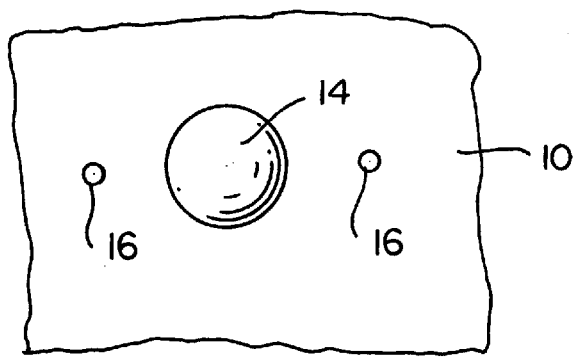

A transfer plate 10 is arranged between the mold plates to position and insert a small generally spherical nucleus into the center of a golf ball core as will be developed below. The transfer plate is flat and contains a plurality of hemispherical recesses 12 in the upper surface as also shown in FIGS. 2 and 3. The number and arrangement of the recesses correspond with the number of spherical cavities provided in the mold plates. Extending from the bottom surface of the transfer plate are a plurality of hemispherical projections 14 which are arranged directly below the hemispherical recesses 12 also shown in FIGS. 2 and 4. The diameter of the recesses and the projections are the same. Next to the bottom projections 14 are at least two pins or spikes 16 which project downwardly adjacent to the projections. Additional spikes may be provided around each projection 14, with each spike being equally spaced from the associated projection.

Before the transfer plate is positioned between the molding plates, it is inverted so that the spikes 16 extend upwardly. A plurality of half-slugs 18 of core forming material are placed on the spikes adjacent to each projection 14, with one half-slug being provided for each projection. The recess 20 for receiving each half-slug is arranged over the corresponding projection. Once the half-slugs are placed on the spikes, the transfer plate is again inverted so that the spikes extend downwardly with the half-slugs being retained on the spikes. Next, nuclei 22 are arranged in each of the hemispherical recesses 12 in the upper surface of the transfer plate. The nuclei are small spherical members such as ball bearings or BBs which have a diameter corresponding with that of the recesses so that the balls fit snugly in the recesses. The nuclei are preferably formed of metal or a composite metal/rubber/plastic material. Upper half-slugs 24 of core material are placed above the nuclei with the recess 26 receiving the portion of the nucleus which projects above the upper surface of the transfer plate 10. The transfer plate 10 is then inserted between the mold plates as shown in FIG. 1.

Figure 5:
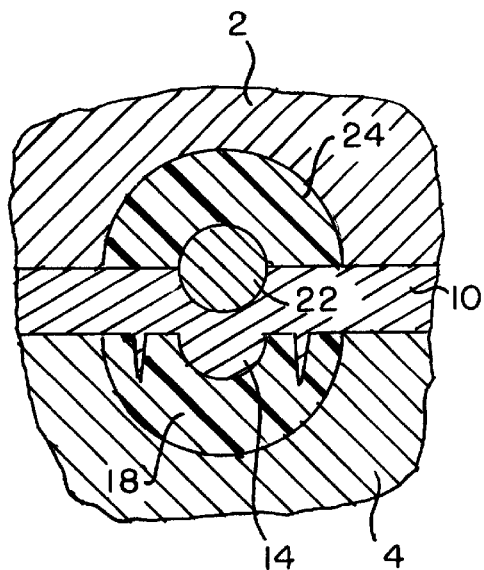
FIGS. 5, 6, and 7 are detailed sectional views showing the operation of the mold plates of the invention in initial molding, open, and final molding positions, respectively.
Figure 6:
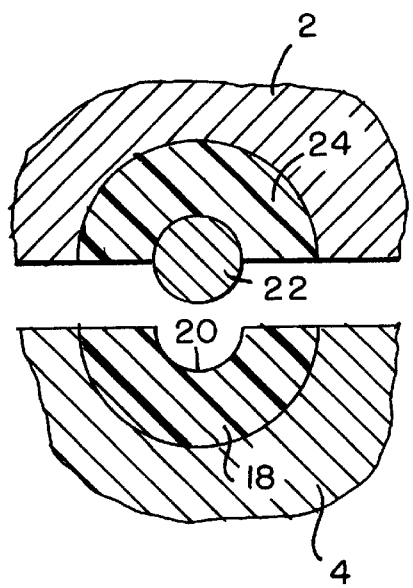
Figure 7:
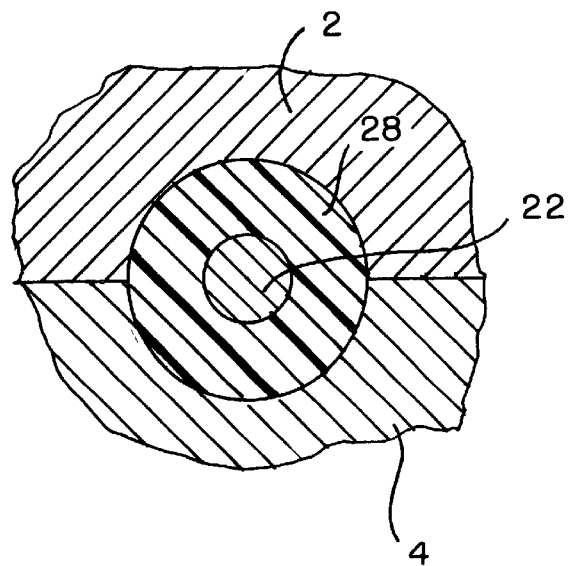

The operation of the core forming apparatus will be described with reference to FIGS. 5–7. The upper 2 and lower 4 mold plates are initially brought together against the transfer plate 10 as shown in FIG. 5. The upper half-slug 24 is partially molded or pre-formed in the upper hemispherical cavity of the upper mold plate 2 and the lower half-slug 18 is partially molded or pre-formed in the lower hemispherical cavity of the lower mold plate 4. In addition, the spherical ball 22 is pressed into the recess of the upper half-slug 24 and the projection 14 of the plate presses into the recess of the lower half-slug 18. The mold plates are then separated and the transfer plate is removed as shown in FIG. 6. With the plate removed, the upper half-slug 24 is retained in the upper hemispherical cavity and the lower half-slug 18 is retained in the lower hemispherical cavity. The nucleus 22 is wedged into the upper half-slug recess and the lower half-slug recess 20 is formed with a hemispherical shape defined by the projection 14. The mold plates are then brought together in mating fashion as shown in FIG. 7 to complete the molding process wherein the upper and lower half-slugs are joined to form the golf ball core 28 with the spherical nucleus 22 centrally arranged therein.

The apparatus of the invention insures that the nucleus is always centered in the core because of the limited tolerances provided by the core forming plate. The elimination of manual placement of the nucleus in a core half prevents the nucleus from being offset from a concentric relation with the finished core. It also speeds up the core formation process.

Figure 8:
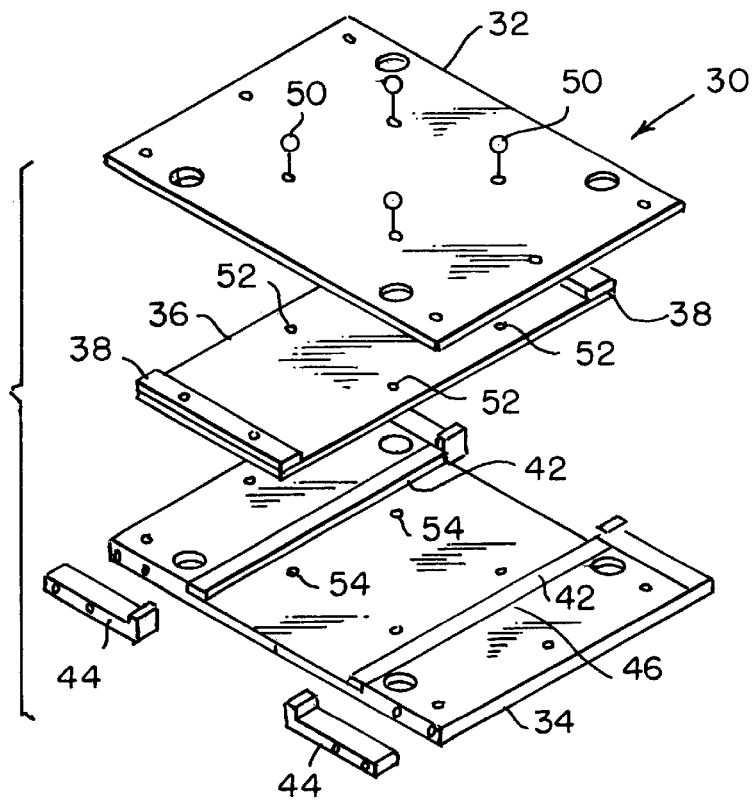
FIGS. 8, 9, and 10 are top, front, and exploded perspective views, respectively of a transfer plate according to a second embodiment of the invention.
Figure 9:
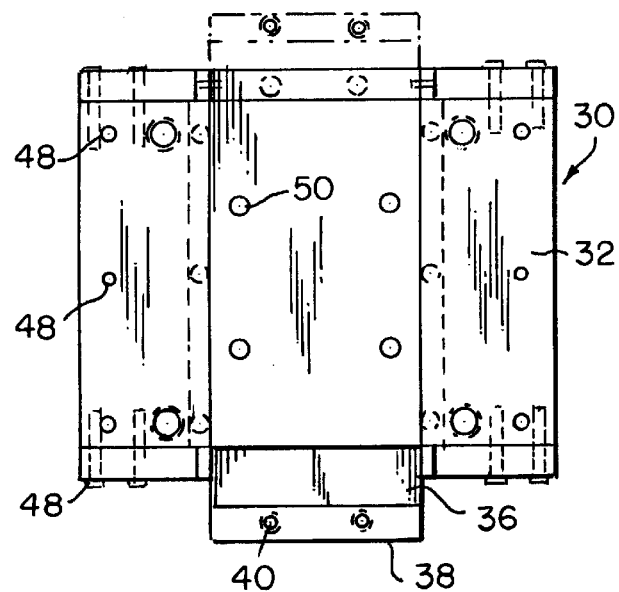
Figure 10:
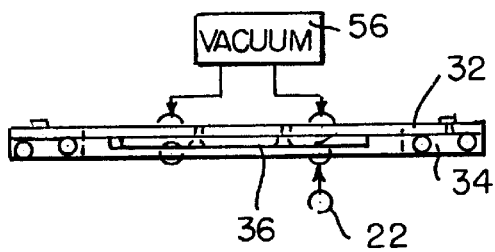

An alternate configuration of the transfer plate is shown in FIGS. 8–10. In this embodiment, the transfer plate 30 comprises three plates: a top plate 32, a bottom plate 34, and a slide plate 36 slidably arranged between the top and bottom plates. The slide plate 36 includes stops 38 at both ends which are connected with the slide plate by fastening devices such as screws 40. The bottom plate includes guide rails 42 and end rails 44 connected with the bottom plate by suitable fasteners such as screws 46. The guide rails space the top and bottom plates and guide the slide plate which is operable between grip and release positions as will be developed in greater detail below. Fasteners such as screws 48 are also provided to connect the top and bottom plates together.

The top plate includes a plurality of projections 50 which are arranged in alignment with the hemispherical cavities of the upper mold plate when the transfer plate 30 is arranged between the mold plates. The slide plate contains a plurality of magnets 52 which are arranged to correspond to the position of the projections when the slide plate is in the grip position as shown in FIG. 9. The bottom plate contains a plurality of openings 54 aligned with the projections 50.

Before the transfer plate is arranged between the mold plates, a nucleus 22 is arranged in each opening 54 from the bottom surface of the bottom plate as shown in FIG. 10. A portion of each nucleus projects from the bottom of the transfer plate. The nuclei are retained in or suspended from the openings in the bottom plate by the magnets 52 in the slide plate when the slide plate is in the grip position shown in FIG. 9. Half-slugs are positioned in the hemispherical cavities of the lower mold plate and additional half slugs are placed on the top plate above the projections and the transfer plate is positioned between the mold plates in a manner similar to that shown in FIG. 1.

The mold plates are brought together in a manner similar to FIG. 5 to partially mold or pre-form the half-slugs in the respective hemispherical cavities. Unlike the embodiment shown in FIG. 5, with the transfer plate 30, the nucleus is positioned in the lower half-slug and the projection is pressed into the upper half-slug. The slide plate is then shifted to the release position shown in phantom in FIG. 9 so that the magnets are offset from the nuclei 22. The nuclei are thus released from the transfer plate as they are pressed into the lower half-slugs. Next the mold plates are separated and the transfer plate is removed with each nucleus being retained in the corresponding lower half-slug and a recess being formed in the corresponding upper half-slug similar to that shown in FIG. 6 but with the nucleus and recess reversed. The mold plates are then brought together in mating fashion as shown in FIG. 7 to complete the molding process of the golf ball core with the nucleus concentrically arranged therein.

Instead of magnets for suspending the nuclei from the transfer plate 30, other nucleus suspending devices may be used. One example is to apply a vacuum 56 through the openings in the slide and bottom plates as shown in FIGS. 8 and 10. When the slide plate is shifted to its release position, the openings in the slide plate are shifted cutting off the vacuum to the nuclei so that the nuclei are released from the transfer plate.

The finished golf ball cores having a concentric spherical nucleus are then arranged in an injection mold where one or more cover layers are applied to the cores to form dimpled golf balls. A two-piece golf ball comprises a core and an outer cover layer while a three-piece ball also includes a mantle layer between the core and cover layer.

While the preferred forms and embodiments of the invention have been illustrated and described, it will be apparent to those of ordinary skill in the art that various changes and modifications may be made without deviating from the inventive concepts set forth above.

What is claimed is:

1. Apparatus for forming golf ball cores having a centered nucleus, comprising
   (a) upper and lower mold plates each containing at least one hemispherical cavity, said upper and lower hemispherical cavities being adapted to mate to define at least one spherical cavity when said plates are brought together; and
   (b) a transfer plate arranged between said mold plates, said transfer plate including means for supporting a generally spherical nucleus for each spherical cavity and for positioning the nucleus in the center of a pair of upper and lower slugs of core material which are molded within said upper and lower hemispherical cavities, respectively, whereby when said mold plates are initially brought together with said transfer plate arranged therebetween and with the upper and lower slugs of core material arranged on opposite sides of said transfer plate relative to said nucleus, the slugs are pre-formed in said hemispherical cavities with the nucleus being pressed within one of the upper or lower slugs, and when said mold plates are separated, said transfer plate is removed, and when said mold plates are subsequently brought together in mating fashion a golf ball core is formed with the nucleus centrally arranged therein.

2. Apparatus as defined in claim 1, wherein said transfer plate includes means for forming a hemispherical cavity in a lower surface of the upper slug when said mold plates are initially brought together.

3. Apparatus as defined in claim 2, wherein said transfer plate includes means for suspending a nucleus beneath each of said slug cavity forming means, each of said nuclei extending below a bottom surface of said transfer plate and being pressed into an upper surface of the lower slug when said mold plates are initially brought together.

4. Apparatus as defined in claim 3, wherein said suspending means comprise magnets.

5. Apparatus as defined in claim 4, wherein said transfer plate includes a slide plate containing said magnets, said slide plate being operable to release the nuclei after said mold plates are initially brought together so that said nuclei are retained in the upper surface of the lower slugs.

6. Apparatus as defined in claim 3, wherein said suspending means comprise a vacuum operable to release the nuclei after said mold plates are initially brought together so that the nuclei are retained in the upper surface of the lower slug.

7. Apparatus as defined in claim 1, wherein said transfer plate includes means for forming a hemispherical cavity in an upper surface of the lower slug when said mold plates are initially brought together.

8. Apparatus as defined in claim 7, wherein said transfer plate contains a plurality of hemispherical recesses in an upper surface thereof above each of said slug cavity forming means, respectively, for receiving the nuclei, each of said nuclei extending above the upper surface of said transfer plate and being pressed into a lower surface of the upper slug when said mold plates are initially brought together.

9. Apparatus as defined in claim 8, wherein said transfer plate includes means for retaining the lower slugs adjacent to said slug cavity forming means, respectively.

10. Apparatus as defined in claim 8, wherein said retaining means comprises a plurality of spikes depending from a lower surface of said transfer plate.

11. A method for forming a spherical golf ball core with a central spherical nucleus, comprising the steps of
   (a) positioning upper and lower slugs of core material opposite each other;
   (b) pressing a generally spherical nucleus with a transfer plate into a surface of one of said slugs and simultaneously forming a hemispherical cavity into an opposing surface of the other of said slugs;
   (c) removing the transfer plate; and
   (d) compression molding said upper and lower slugs together with said other slug hemispherical cavity receiving a lower portion of the nucleus, whereby the nucleus is centered within a core defined by said molded slugs.

12. A method for forming a spherical golf ball core with a central spherical nucleus, formed by
   (a) positioning upper and lower slugs of core material opposite each other;
   (b) pressing a generally spherical nucleus with a transfer plate into a surface of one of said slugs and simultaneously forming a hemispherical cavity into an opposing surface of the other of said slugs;
   (c) removing the transfer plate; and
   (d) compression molding said upper and lower slugs together with said other slug hemispherical cavity receiving a lower portion of said nucleus to form a finished golf ball core with said nucleus centered therein.

* * * * *